Aug. 6, 1940.　　　　　J. SLEPIAN　　　　2,210,690
IGNITRON SYSTEM
Filed Sept. 21, 1939　　　3 Sheets-Sheet 1

WITNESSES:
Wm. B. Sellers.
Thos. C. Groome

INVENTOR
Joseph Slepian.
BY
F. W. Lyle
ATTORNEY

Aug. 6, 1940.  J. SLEPIAN  2,210,690

IGNITRON SYSTEM

Filed Sept. 21, 1938  3 Sheets-Sheet 2

WITNESSES:
Wm. B. Sellers.
Thus. C. Groome

INVENTOR
Joseph Slepian.
BY
F. W. Lyle.
ATTORNEY

Aug. 6, 1940.                J. SLEPIAN                 2,210,690
                           IGNITRON SYSTEM
               Filed Sept. 21, 1938         3 Sheets-Sheet 3

INVENTOR
Joseph Slepian.

Patented Aug. 6, 1940

2,210,690

UNITED STATES PATENT OFFICE 2,210,690

IGNITRON SYSTEM

Joseph Slepian, Pittsburgh, Pa., assignor to Westinghouse Electric & Manufacturing Company, East Pittsburgh, Pa., a corporation of Pennsylvania Application September 21, 1938, Serial No. 230,979

11 Claims. (Cl. 175—354)

My invention relates to circuits in which a plurality of electrical discharge devices are connected respectively in the different phases of an alternating-current system to conduct current to or from a direct-current system, and, in particular, relates to circuits of the foregoing type in which the discharge devices are provided with control electrodes.

One object of my invention is to provide a system in which electrical discharge devices connected to different phases of an alternating voltage source may be caused to carry currents which have substantially the same mean value.

Another object of my invention is to provide arrangements whereby electrical discharge devices having control electrodes and connected to different phases of an alternating voltage source may be caused to carry currents of which the mean value during an alternating cycle shall have any predetermined ratio to each other.

Still another object of my invention is to provide an arrangement whereby fluctuations of the direct-current output voltage during each alternating-current cycle of a system in which a plurality of electrical discharge devices are connected to the respective phases of an alternating-current source shall be minimized.

A further object of my invention is to provide an arrangement whereby dissimilarities in conductivity between a plurality of gaseous electrical discharge devices connected to transmit current from the respective phases of an alternating-current system to or from a direct-current system may be prevented from causing dissymmetrical fluctuations of the direct current during the alternating-current cycles.

A still further object of my invention is to provide an arrangement whereby dissimilarities in the conductivity of a plurality of electrical discharge devices respectively connected to the various phases of an alternating-current line to conduct current to or from a direct-current line shall be prevented from causing uneven distribution of load current between the different electrical discharge devices.

Other objects of my invention will become apparent from reading the following description, taken in connection with the drawings in which.

Figure 4:
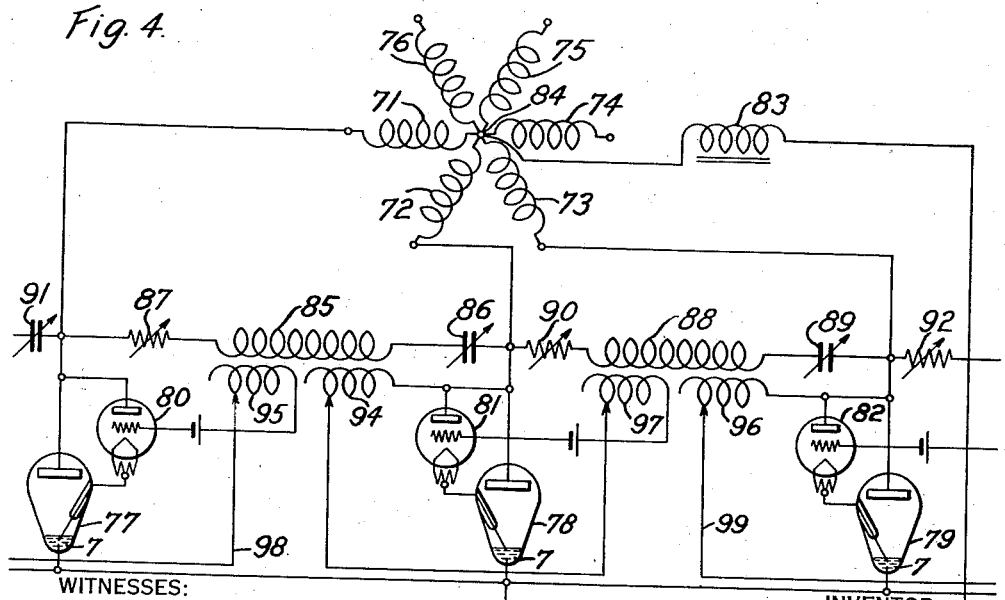
Figure 5:
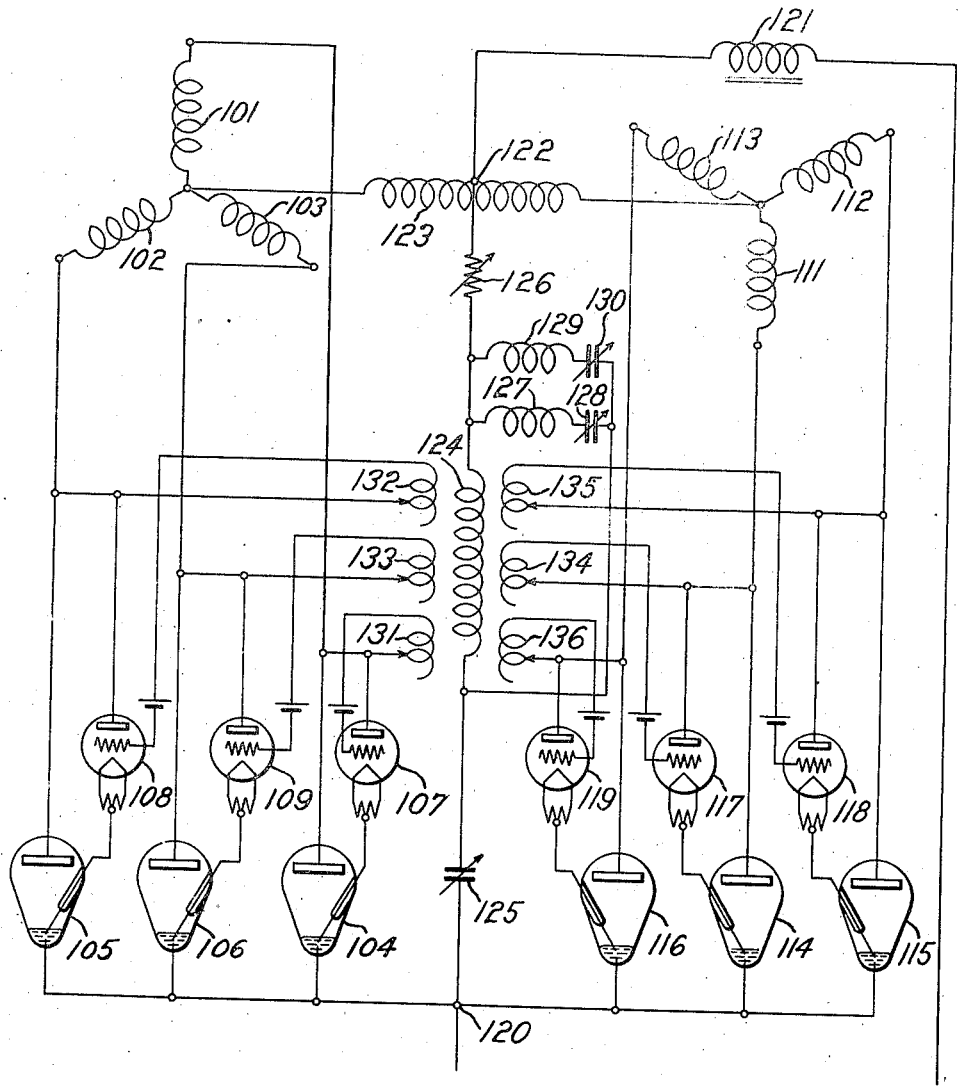

Fig. 4 illustrates a circuit connection in which three electrical discharge devices connected to the respective phases of a three-phase line are provided with arrangements embodying still another modification of my invention; and Fig. 5 shows an arrangement in which six electrical discharge devices are connected to the respective phase terminals of a six-phase alternating-current line and are provided with circuits embodying still another modification of my invention.

Electrical systems in which a plurality of electrical discharge devices are respectively connected to the different phase terminals of alternating-current circuits are well known, and where the discharge tubes are substantially identical in their electrical properties, i. e. particularly in their electrical conductivity, they will divide the load current equally between them in the conventional case where the circuits constitute a symmetrical system. "Dividing the load current equally between them" means, in the present instance, that the average value through the alternating-current cycle of the currents in different tubes is the same, although, of course, the instantaneous values at any one particular moment differ from each other. However, in practical rather than ideal cases, the electrical characteristics of the discharge tubes are likely to differ somewhat, and even if the other components of the electrical circuits are ideally symmetrical, the various electrical discharge tubes will then not divide the current equally. Furthermore, even slight dissymmetries in the electrical elements constituting the different phases of the alternating-current system will cause unequal division of load even were the electrical discharge tubes ideally identical with each other.

To take one instance of the foregoing, electrical discharge devices of the type known as Ignitrons are likely to exhibit dissimilarities. An Ignitron tube consists of an anode, a cathode usually of mercury and a so-called igniter electrode, the latter comprising a rod of some high resistance material, such as boron carbide, which dips into the mercury and which is caused to initiate ionization adjacent the cathode surface early in those half cycles of the alternating supply voltage which makes the line terminal to which the anode is connected positive. The ionizing effect is produced by a sudden flow of current through the igniter electrode, and the instant in the alternating-current cycle at which ionization is initiated can be predetermined by properly timing the initiation of current through the igniter electrode. For further description of Ignitron tubes, reference is made to Slepian and Ludwig Patent No. 2,069,283, granted February 2, 1937. In the case of such Ignitron tubes, slight unavoidable dissimilarities in the igniter electrodes and tube conditions may cause slight variations in the precise instant in the alternating-current cycle at which current flow between the anode and the cathode rises to full value.

Figure 1:
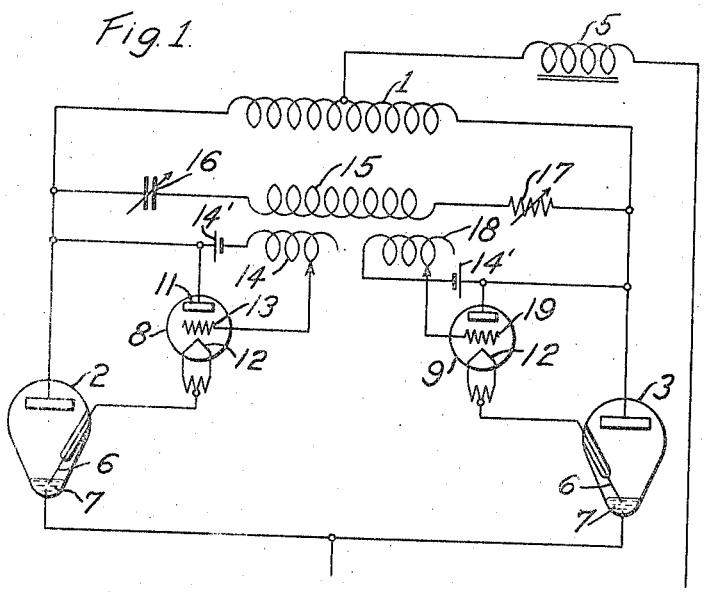
Figure 1 illustrates a pair of electrical discharge devices connected to line-terminals of a single-phase alternating-current circuit and provided with arrangements embodying the principles of my invention.

It can be shown that where two electrical, absolutely identical, discharge tubes are connected in a symmetrical system of the type shown in Fig. 1, the voltage and current in one tube will be identical with the voltage and current in the other tube, except that they will be displaced in time from each other by 180 electrical degrees of the voltage wave in the supply system. Such being the case, the wave form of the potential difference between the two anodes will show no even harmonics of the alternating-current line frequency. On the other hand, if the two tubes are not absolutely identical, or if there is a dissymmetry in the alternating-current circuits so that one tube carries more current than the other, it can be shown that even harmonics will exist in the potential difference measured between the tube anodes. Where the supply approximates closely to a sine wave, it will usually be found that the second harmonic will be pronounced in the potential difference between the two anodes.

It is the conventional practice to supply current to the respective igniter electrodes of the different tubes through a grid-controlled electrical discharge device. I have discovered that by deriving a second harmonic voltage from a circuit connected across the two anodes of the two-tube system shown in Fig. 1 and impressing it in proper magnitude on the control electrode of the tube supplying current to the igniter electrode, I can neutralize the tendency of either of the two principal discharge tubes to conduct more than its share of the load current. I have also found it possible to derive second harmonic voltages from other portions of a system involving two tubes and to use these voltages to compensate any tendency toward unequal division of current between the tubes. I have also discovered that it is possible to derive harmonic voltages other than the second which may be applied in the case of three-phase systems, six-phase systems or the like to similarly compensate tendencies toward unequal division of load between the tubes in such systems. I have, in fact, discovered general methods by which a discharge tube system of any number of phases, such as $n$ phases, may be made to supply voltages of the proper harmonic frequency to compensate any tendency toward unequal division load current between the tubes used in the $n$-phase system.

Referring to Fig. 1 of the drawings, with the foregoing principles in mind, an alternating-current source 1, which may be the secondary of a transformer supplied with sinusoidal single-phase voltage, has its respective terminals connected to the anodes of two electrical discharge tubes 2 and 3 which I have shown as being of the Ignitron type. The cathodes of these electrical discharge tubes are both connected to the positive terminal of a direct-current load circuit, the negative terminal of this circuit being connected through an inductance 5 to the midpoint of the secondary 1. Each of the Ignitron tubes is provided with an igniter electrode 6 which dips into a mercury cathode 7. The igniter electrode of tube 2 is supplied with current through a grid-controlled electrical discharge tube 8, and a similar discharge tube 9 supplies current to the igniter electrode of tube 3. The tube 8 includes, besides an anode 11 and an excited cathode 12, a control electrode 13 which is connected to the circuit of its anode and cathode by the secondary 14 of a transformer. A bias battery 14' may be provided to impress a bias-voltage on control electrode 13. This transformer has a primary 15 which is connected through a capacitor 16 and a resistor 17 in shunt between the anodes of the tubes 2 and 3. A similar secondary 18 controls the potential of the control electrode 19 of tube 9. The polarity of windings 14 and 15 is made such that, when the end of winding 15, which is nearest to tube 2, is positive, the end of winding 14, which is connected to grid 13, is more positive than its other end. Conversely when that end of winding 14 which is connected to its grid 13 is positive, the polarity of winding 18 is such that that end of it which is connected to grid 19 is more positive than its other end.

The capacitor 16 and the winding 15 are tuned to the second harmonic of the sinusoidal voltage supplied to winding 1, and the value of resistor 17 is adjusted to maintain the current flowing through the shunt circuits embodying it within a reasonable value. The value in ohms of resistor 17 should in general be small compared with that of condenser 16 at the frequency to which 15 and 16 resonate. The voltage impressed by the winding 14 upon the control electrode 13 may then be adjusted to such a value that an ammeter, connected directly in series with the anode of tube 2, shows substantially the same value as does a similar ammeter connected directly in series with the anode of tube 3.

To illustrate a typical circuit embodying my invention, the secondary winding 1 may impress a sinusoidal voltage of 1200 volts at 60 cycles upon the tubes 2 and 3. The latter may be Ignitron tubes of the type WL656, manufactured by Westinghouse Electric & Manufacturing Company, rated at 600 volts and 100 amperes. The igniter electrodes 6 are rated at 15 amperes, and the tubes 8 and 9 may be tubes of the type 628, manufactured by Westinghouse Electric & Manufacturing Company, and rated at 10 amperes and 1000 volts. The capacitor 16 may be of 10 microfarads; the winding 15 have an open-circuit inductance of about 100 millihenries; and the resistor 17 be of 0 ohms. The windings 14 and 18 may each derive a voltage which is 100 percent of that across the terminals of the winding 15.

Figure 2:
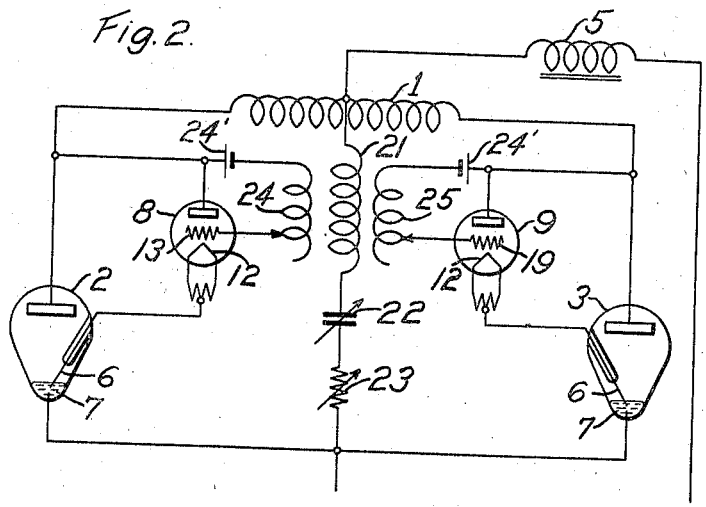
Fig. 2 shows a similar arrangement of two discharge devices connected to a single-phase line and provided with a different arrangement embodying the principles of my invention.

Referring now to Fig. 2 of the drawings, a sinusoidal alternating voltage may be supplied by a winding 1 having Ignitron tubes 2 and 3 connected to its terminals in a way which requires no separate description because it is identical with Fig. 1. It can be shown that where two tubes, such as are here shown, are ideally identical with each other and the connections of the winding 1 and its load circuit are ideally symmetrical, the voltage between the midtap of winding 1 and the cathodes of tubes 2 and 3 contains only even harmonics of the aforesaid sinusoidal voltage. On the other hand, if one of the tubes 2 and 3 differs in electrical characteristics from the other so that the current is divided unequally between them, voltages which are odd harmonics of the aforesaid sinusoidal voltage will appear between the cathode 7 and the aforesaid midtap.

In most cases, it will be found that the first harmonic of the aforesaid sinusoidal voltage (i. e. the fundamental frequency itself) will be the most pronounced of these odd harmonics. I, accordingly, connect a primary winding 21 in series with a capacitor 22 and a resistor 23 between the cathode 7 and the aforesaid midtap. I then connect a secondary winding 24, influenced by the primary 21, between the grid electrode 13 of the tube 8 and some point on the circuit between its cathode and anode. For example, the winding 24 may be connected through a bias-battery 24' between the anode and the grid 13, as illustrated. I connect a similar secondary winding 25 between the grid and anode circuit of the tube 9. I make the polarity of the windings 24 and 21 such that the end of winding 24, which is connected to grid 13, is positive when the end of winding 21 adjacent the aforesaid mid-tap connection is positive relative to its other end. I then adjust the capacitor 22 and the winding 21 so that they are tuned to the fundamental frequency of the above-mentioned sinusoidal wave, and adjust the value of resistor 23 so that the current flowing through capacitor 22 is of a safe value. This adjusted value will in general be small relative to the reactance of condenser 22 at the frequency to which condenser 22 and inductance 21 resonate. The voltage of secondary winding 24 may then be adjusted by moving a variable tap connection thereon and an ammeter connected directly in series with the anode of tube 2 shows the nearest possible equality to the rating of a similar ammeter connected in series with the anode of tube 3.

Assuming that the elements 1, 2 and 3 are the same as those already described in Fig. 1, the capacitor 22 may be of 10 microfarads, the winding 21 have an open-circuit inductance of about 400 millihenries. Windings 24 and 25 should then each have a terminal voltage which is about 100 percent of the voltage impressed across the terminals of winding 21. The lower terminal of winding 25 should be negative relative to its upper terminal when the lower terminal of winding 24 is positive relative to its upper terminal.

Figure 3:
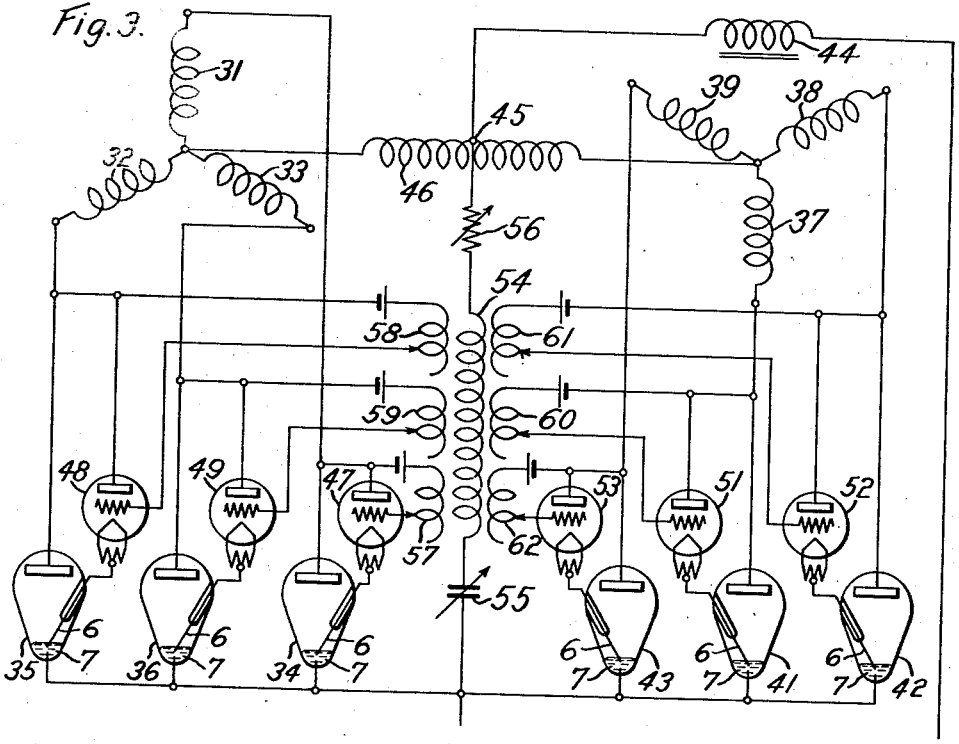
Fig. 3 shows an arrangement of six electrical discharge devices connected to a six-phase alternating-current system and provided with arrangements embodying the same principles as Fig. 2 of my invention.

In Fig. 3, I have shown how the principles used in connection with Fig. 2 may be applied to a six-phase rectifier of the type sometimes referred to as "diametrical three-phase". In this arrangement, a Y-connected three-phase transformer secondary comprising three windings 31, 32, 33 may be supplied with power from a three-phase primary winding, not shown, and may have its three-phase terminals respectively connected to three Ignitron tubes 34, 35, 36, as shown in the drawings. A similar set of three-phase secondaries 37, 38, 39 may be supplied with current of the same voltage from the same three-phase primary, and the free terminals of windings 37, 38 and 39 may be connected respectively to the anodes of three Ignitron tubes 41, 42 and 43. As is indicated in the drawings, the voltage impressed by winding 37 on the anode of tube 41 is 180 degrees out of phase with the voltage impressed on the anode of tube 34 by the winding 31, and a similar relationship exists between the voltages of the other secondary windings mentioned. The cathodes 7 of the Ignitron tubes above-mentioned are connected to the positive terminal of a direct-current load, the negative terminal of the latter being connected through an inductance 44 to the midpoint 45 of an equalizer winding 46 of a type too well known in the rectifier art to require detailed description. The end terminals of the winding 46 are respectively connected to the center terminal of the two sets of Y-connected secondary windings previously described.

The igniter electrodes 6 of the above-mentioned Ignitron tubes 34, 35, 36, 41, 42, 43 are respectively supplied with current through grid-controlled discharge tubes 47, 48, 49, 51, 52, 53 similar to tubes 8 and 9 of Fig. 1.

I have found that, when the windings 31, 32, 33, 37, 38, 39 generate a set of six absolutely symmetrical six-phase voltages and the tubes 34, 35, 36, 41, 42, 43 are identical in their electrical characteristics, and the electrical system is otherwise perfectly symmetrical, the voltage appearing between the tap 45 and the common cathode terminals of the Ignitron tubes contains no third harmonic of the fundamental frequency of the above-mentioned sinusoidal voltage. On the other hand, where the mean value during the alternating-current cycle of the current supplied by the group of windings 31, 32, 33 differs from the mean value of the current supplied by the group of windings 37, 38, 39, a third harmonic of the aforesaid sinusoidal voltage appears between the tap 45 and the common cathode terminals of the Ignitron tubes.

In order to neutralize such a tendency of the two aforesaid groups to divide current unequally, I connect between the tap point 45 and the cathodes of the Ignitron tubes a primary winding 54 in series with a variable capacitor 55 and a variable resistor 56. The capacitor 55 and the open-circuit inductance of primary 54 are tuned to the third harmonic of said sinusoidal voltage, and the value of resistor 56 is adjusted until the current through it is of a safe value, the resistor having an adjusted resistance which is small compared to the reactance at the third harmonic frequency of capacitor 55. I then connect a secondary winding 57 between the grid of tube 47 and some point on its anode-to-cathode circuit, such as its anode. I connect similar secondary windings 58, 59, 60, 61, 62, respectively, to the grid electrodes of tubes 48, 49, 51, 52, 53. I make the relative polarities of the windings 54 and 47 such that the end of winding 47, which connects to grid 13, is positive relative to its other end when the end of winding 54, which is nearer to the tap point 45, is positive relative to its other end. I make the polarities of windings 58, 59, 60, 61 and 62 the same relative to winding 54, as I have just described for winding 57, relative to its other terminal.

To describe a typical embodiment of my invention, the tubes 34, 35, 36, 41, 42, 43 may be identical with the tube 2 described above in connection with Fig. 1, and the tubes 47, 48, 49, 51, 52, 53 may be identical with the tube 8 described in connection with Fig. 1. The transformer windings 31, 32, 33, 37, 38, 39 may each have a voltage of 600 volts at 60 cycles and have a current rating of 100 amperes. The equalizing winding 46 may have an open-circuit inductance of 10 henries and have a current rating of 600 amperes. The primary winding 54 may have an open-circuit inductance of about 100 millihenries; the capacitor 55 may be of 1 microfarad. The winding 47 may have a sufficient number of turns so that it has a terminal voltage which is 100 percent of the terminal voltage across winding 54. The windings 58, 59, 60, 61, 62 may then be of the same number of turns as winding 47.

Referring to Fig. 4 of the drawings, six identical secondary windings 71, 72, 73, 74, 75, 76 may be supplied with sinusoidal voltage from a primary winding, not shown. The windings 71, 72, 73, 74, 75, 76 being as shown connected in star to form a symmetrical six-phase system, their respective free terminals may be connected to the anodes of six Ignitron tubes, of which it will be sufficient to show three, 77, 78, 79, the others being connected in exactly the same way to windings 74, 75, 76. Each one of these may be of the same type as the tube 2 in Fig. 1. The three Ignitron tubes 77, 78, 79 are respectively supplied with igniter current by three grid-controlled discharge tubes 80, 81, 82, each of which may be identical with the tube 8 in Fig. 1. The remaining three Ignitron tubes are provided with three similar igniter tubes. The cathodes 7 of the Ignitron tubes may be connected to one terminal of a direct-current circuit, the other terminal thereof being connected through an inductance 83 to the neutral point 84 of the star-connected windings 71, 72, 73, 74, 75, 76.

Between the anode of each Ignitron tube and the anode of each tube adjacent to it is connected a current channel comprising a primary winding, a variable capacitor and a variable resistor similar, respectively, to the winding 15, the capacitor 16 and the resistor 17 shown in Fig. 1. In order to simplify the drawings, only those channels which connect the anode lead of one Ignitron tube 78 to the anode leads of its adjacent tubes 77 and 79 have been shown in Fig. 4, but it is to be understood that an exactly similar channel interconnects Ignitron 77 with the adjacent Ignitron (not shown) the anode of which connects with the free terminal of winding 66; that a similar channel connects the anode of Ignitron 79 with the anode lead of the Ignitron receiving current from the free terminal of winding 74, and so on, until such channels form a closed ring interconnecting the anodes of all the Ignitron tubes. Thus the primary winding of the channel between the tube 78 and tube 77 is referred to by the numeral 85, the capacitor in that channel by the numeral 86 and the resistor in that channel by the numeral 87. Similarly, the primary winding in the channel connecting the anode of the tube 78 with that of tube 79 has the reference numeral 88, the capacitor has the reference numeral 89 and the variable resistor the reference numeral 90. The capacitor for the channel interconnecting Ignitron 77 with the Ignitron adjacent it on the left has the reference numeral 91, and the resistor of the channel connecting Ignitron 79 with the adjacent Ignitron on its right bears the reference numeral 92. In operating the above-described system, the inductance 85 and the capacitor 86 are tuned to a sixth harmonic of the sinusoidal supply voltage mentioned above. Resistor 87 is then adjusted so that the current through winding 85 is kept down to a safe value, its value in ohms being small compared to the reactance at the sixth harmonic frequency of capacitor 86. Similar adjustments are made for the primary winding, capacitor and resistor in each of the other above-mentioned current channels.

Primary winding 85 is provided with a pair of secondary windings 94, 95. Primary winding 88 is provided with a pair of secondary windings 96, 97. Similar pairs of secondary windings are provided for each of the six primary windings occupying the six current channels which interconnect the anode leads of the respective Ignitrons. The polarity of the secondary windings 94 and 95 relative to the polarity of winding 85 is such that the right-hand end of each secondary winding is positive when the right-hand end of winding 85 is positive; and vice versa. The same relationship exists between the secondary windings 96, 97 and their primary winding 88; and so on for all the secondary windings which are associated with the other pairs of Ignitrons forming the complete system. The polarities of the secondary windings being as indicated above, the right-hand end of winding 94 is connected to the anode of tube 78, and a variable tap on winding 94 is then connected to a variable tap on the left-hand end of winding 97. The right-hand end of winding 97 is then connected to the grid of the three-electrode tube 81, which supplies the igniter current to Ignitron 78. In an exactly similar way, the grid of three-electrode tube 80, which supplies the igniter current to Ignitron 77, is connected to the right-hand end of the secondary winding 95, and the variable tap on the winding 95 is connected to a lead 98 which extends to a variable tap near the left-hand end of the secondary winding which occupies the same relative position in the current-channel between Ignitron 77 and the Ignitron on its left that winding 94 occupies in the current channel connecting Ignitron 78 with Ignitron 77.

In a similar way, the right-hand end of secondary winding 96 is connected to the anode of Ignitron 79, and a variable tap near its left end is connected through a lead 99 to the secondary winding which occupies the same relative position in the current-channel connecting Ignitron 79 with the adjacent Ignitron at its right that secondary 97 occupies in the current-channel connecting Ignitron 78 with Ignitron 79.

A moment's consideration will show that the repetition for all the six Ignitrons of the connections just described for the secondary windings 94 and 97 in connection with Ignitron 78 will produce an absolutely symmetrical set of connections interlinking all of the Ignitrons, and that while these connections are shown for the three adjacent Ignitrons 77, 78, 79, the circuit diagram represents the complete interconnections of any three adjacent Ignitrons in the complete system.

To describe one specific embodiment of the system shown in Fig. 4, the Ignitron tubes may each be of the same type as the tube 2 described in connection with Fig. 1, and the grid-controlled discharge tubes 80, 81, etc. may be of the same kind as tube 8 described in connection with Fig. 1. The transformer windings 71, 72, 73, 74, 75, 76 may each have a rating of 600 volts and 100 amperes at 60 cycles and form a symmetrical star-connected six-phase system. The primary 85 may have an open-circuit inductance of about 100 millihenries. The condenser 86 may have a capacity of 10 microfarads. The two secondary windings 94 and 95 may each produce a voltage which is 100 percent of the terminal voltage of primary 85.

In Fig. 5, I disclose another modification of my invention which is adapted to equally divide current between six Ignitrons connected in a balanced six-phase system of the type frequently referred to as a "diametrical three-phase". This system comprises one set of three Y-connected secondary windings 101, 102, 103 in which are induced a symmetrical set of three-phase sinusoidal voltages derived from a primary winding, not shown. The free terminals of the windings 101, 102, 103 are, respectively, connected to the anodes of three Ignitrons 104, 105, 106, each of the same type as the tube 2 in Fig. 1. The igniter electrode current for the three Ignitrons 104, 105, 106 are, respectively, furnished by three grid-controlled auxiliary tubes 107, 108, 109, which may be similar to the tube 8 described in connection with Fig. 1. A second set of Y-connected three-phase windings 111, 112, 113 derives current from the above-mentioned set of primary windings (not shown) and has its free ends connected to the anodes of a second set of three Ignitrons 114, 115, 116 as nearly as possible similar to the Ignitrons 104, 105, 106.

As is indicated by Fig. 5, the voltage in the winding 111 is equal to but opposite in phase to the voltage in winding 101 so that the voltages in the six enumerated windings constitute a set of symmetrical six-phase voltages. The tubes 114, 115, 116 are, respectively, supplied with igniter current by a set of grid-controlled tubes 117, 118, 119 of similar type to the above-described tubes 107, 108, 109. The cathodes of all the six Ignitron tubes are connected to one terminal of a direct-current load system, the negative terminal of which is connected through an inductance 121 to the midtap 122 of an equalizer winding 123 of well known type. The free terminals of the winding 123 are, respectively, connected to the central points of the two sets of three-phase windings already described.

I have found that, when such a six-phase system of Ignitrons and windings, as I have just described, has absolutely identical circuit elements in each of its phases, the voltage between the cathode terminal 120 and the tap 122 contains no harmonics except the sixth harmonic of the above-mentioned sinusoidal voltage. On the other hand, when some dissymmetry exists between the various phases, other harmonics appear between the terminals 120 and 122. In most cases, I have found that the principal harmonics which thus appear are the first, the second, the third, the fourth and the fifth. I find that by deriving from a channel interconnecting the terminals 120 and 122 a set of harmonic voltages which exclude the sixth and its integral multiples and impressing these voltages on the control electrodes of the tubes 107, 108, 109, 117, 118, 119, I can minimize the tendency of the above-mentioned other harmonic groups characterizing unequal load division to flow in the circuit, thereby approximating a condition of equal division of load between the Ignitrons.

Corresponding with the foregoing principle, I interconnect the terminals 120 and 122 by a channel comprising a primary winding 124, a variable capacitor 125 and a variable resistor 126. Across the terminals of the primary winding 124 I shunt one circuit tuned to the sixth harmonic and comprising an inductance 127 and a variable capacitor 128; a second circuit tuned to the twelfth harmonic comprising an inductance 129 and a variable capacitor 130. In order to obtain still greater refinement, I may similarly shunt the winding 124 with a circuit comprising an inductance and capacitor tuned to any other multiple of the sixth harmonic.

Between the grid of the tube 108 and some point on its anode-cathode circuit, which may if desired be at the anode, I connect a secondary winding 131 which is in inductive relation to the primary 124. I make the relative polarities of the windings 124 and 131 such that, when the lower end of the winding 124 is positive, the lower end of the winding 131 is positive. Windings 132, 133, 134, 135, 136, exactly similar to winding 131, are also provided as secondary windings cooperating with primary winding 124. The upper terminal of winding 131 is then connected to the grid electrode of tube 107, and a variable tap near its lower end is connected to a point on the anode-tube-cathode circuit of tube 107; this point can easily be the anode itself. In similar fashion the upper end of the windings 132, 133, 134, 135, 136 are connected to the control electrodes of tubes 108, 109, 117, 118, 119, and the lower terminals of each of the windings just enumerated are connected to the anodes of the same tubes.

In order to operate the system of Fig. 5, the open-circuit inductance of the winding 124 and the capacitor 125 are tuned to the frequency of the sinusoidal supply voltage mentioned above. The resistor 126 is adjusted to such a value as to hold the current through capacitor 125 to a safe value, but its resistance should be small relative to the reactance at the frequency of the supply voltage of capacitor 125. The inductance 127 and the capacitor 128 are then adjusted so that they resonate at the frequency of the sixth harmonic of the aforesaid sinusoidal voltage. The inductance 129 and the capacitor 130 are then tuned to resonate at the twelfth harmonic of the above-mentioned sinusoidal voltage.

I have described the principles of my invention as applied to a single-phase system and also as applied to a six-phase system. In order to show how the system may be applied to a system of any desired number of, say, $n$, symmetrical phases, I would note that where the primary winding of the compensating transformer is located in a channel interconnecting the anodes of two adjacent rectifiers of an $n$-phase system, each such channel is tuned to the $n$th harmonic of the sinusoidal supply voltage. This is true, for example, of Fig. 1 where the supply transformer has two phase-terminals each connected to the anode of a rectifier; and is similarly true of Fig. 4 where the supply transformer has six phase-terminals each connected to the anode of a rectifier. In the case of Fig. 1, the channel containing transformer primary 15 is tuned to the second harmonic of the supply voltage, and in the case of Fig. 4, the transformers, primaries 85, 88, etc. are each contained in a channel tuned to the sixth harmonic of the supply voltage.

On the other hand, where the primary of the compensating transformer is connected between the terminals of the direct-current load circuit, the channel containing it is tuned to some harmonic other than the $n$th. This other harmonic preferably is the one shown by measurements or by experience to be most prominent when the currents divide unequally between the rectifier tubes. Usually this will be found to be the $(n-1)$th harmonic or the $(n+1)$th harmonic. It will be recognized that no completely general rule can be laid down for choosing the harmonic other than the $n$th to which the compensating transformer channel is to be tuned, since it will depend upon the way in which the electrical characteristics of the separate Ignitrons differ from each other. It is, accordingly, frequently advisable to tune the compensating channel bridging the direct-current load to first one harmonic after another and to select that arrangement which causes the most even distribution of current between the various rectifier tubes. In the case of the arrangement of Fig. 5, it will be evident that the shunt circuits which bridge the compensating transformer should be tuned to resonate at the $n$th, the two $n$th, the three $n$th, etc. harmonics of the fundamentals.

While I have described my arrangement as applied to Ignitrons, it will be recognized that the system is not confined to this particular type of tube, but may be applied where the Ignitrons are replaced by any type of discharge tube employing control electrodes. The system is, for example, applicable, not only in the case of gaseous discharge tubes, but even in the case of high-vacuum tubes. I will also point out that where the main power tubes are of types which do not require such auxiliary tubes as the grid-controlled tubes 8 and 9 in Fig. 1, the leads shown as connected to the control grids 13 in the present drawings may be connected to control electrodes in the main discharge tubes themselves.

In accordance with the patent statutes, I have described several specific embodiments of my invention, but the principles thereof are of broader application, as will be evident to those skilled in the art. I accordingly desire that the following claims shall be given the broadest interpretation of which their terms are susceptible in view of the prior art.

I claim as my invention:

1. An electrical translating system comprising a six-phase alternating-current network having connected to each phase terminal an electrical discharge device having a control circuit, an electrical channel tuned to the sixth harmonic of the frequency of said alternating-current network bridging two phase-terminals thereof, and means energized by said channel to impress a voltage of said sixth harmonic frequency on said control circuit.

2. An electrical translating system comprising a six-phase alternating-current network having connected to each phase terminal an electrical discharge device having a control circuit in which current flow initiates conduction by said device, an electrical channel tuned to the sixth harmonic of the frequency of said alternating-current network bridging two phase-terminals thereof, and means energized by said channel to impress a voltage of said sixth harmonic frequency on said control circuit.

3. An electrical translating system comprising a six-phase alternating-current network having connected to each phase terminal a gaseous electrical discharge device having an igniter contacting the surface of its cathode and having a control circuit supplying current to said igniter, an electrical channel tuned to the sixth harmonic of the frequency of said alternating-current network bridging two phase-terminals thereof, and means energized by said channel to impress a voltage of said sixth harmonic frequency on said control circuit.

4. An electrical translating system comprising a six-phase alternating-current network having connected to each phase terminal a gaseous electrical discharge device having an igniter contacting the surface of its cathode and having a control circuit supplying current to said igniter and embodying an electrical discharge tube provided with another control circuit, an electrical channel tuned to the sixth harmonic of the frequency of said alternating current network bridging two phase-terminals thereof, and means energized by said channel to impress a voltage of said sixth harmonic frequency in said control circuits.

5. An electrical translating system comprising an alternating-current network having connected to each phase-terminal an electrical discharge device having a control circuit, means to impress a second harmonic of the alternating-current voltage to control current flow in said control circuit, and a circuit having a frequency different from that of said network connected to exchange power therewith through said electrical discharge devices.

6. An electrical translating system comprising an $n$-phase alternating-current network having connected to each phase-terminal an electrical discharge device having a control circuit, means to impress a voltage which is an $n$th harmonic of the frequency of said alternating-current network to control current flow in said control circuit, and a circuit having a frequency different from that of said network connected to exchange power therewith through said discharge devices.

7. An electrical translating system comprising an $n$-phase alternating-current network having connected to each phase-terminal an electrical discharge device having a control circuit, a current channel tuned to the $n$th harmonic of the frequency of said network bridging a phase of said network, and means to impress a voltage derived from said channel to control current flow in said control circuit.

8. An electrical translating system comprising an $n$-phase alternating-current network having connected to each phase-terminal a gaseous electrical discharge device having an igniter contacting its cathode, a control circuit supplying current to said igniter, and means to impress a voltage which is an $n$th harmonic of the frequency of said network upon said control circuit.

9. An electrical translating system comprising an $n$-phase alternating-current network having connected to each phase-terminal a gaseous electrical discharge device having an igniter contacting its cathode, a control circuit supplying current to said igniter, a current channel tuned to the $n$th harmonic of the frequency of said network connected across one phase thereof, and means to impress a voltage derived from said network to control current flow in said control circuit.

10. An electrical translating system comprising an $n$-phase alternating-current network having connected to each phase-terminal a gaseous electrical discharge device having an igniter contacting its cathode, a control circuit supplying current to said igniter and embodying a tube having a control circuit, and means to impress a voltage which is an $n$th harmonic of the frequency of said network upon the last mentioned control circuit.

11. An electrical translating system comprising an $n$-phase alternating-current network having connected to each phase-terminal a gaseous electrical discharge device having an igniter contacting its cathode, a control circuit supplying current to said igniter, a current channel tuned to the $n$th harmonic of a frequency of said network bridging a phase thereof, and means to impress a voltage derived from said channel upon said control circuit.

JOSEPH SLEPIAN.